March 10, 1931.  F. C. THOMPSON  1,795,908
CHAIN ADJUSTING DEVICE
Filed Jan. 26, 1926  2 Sheets-Sheet 2

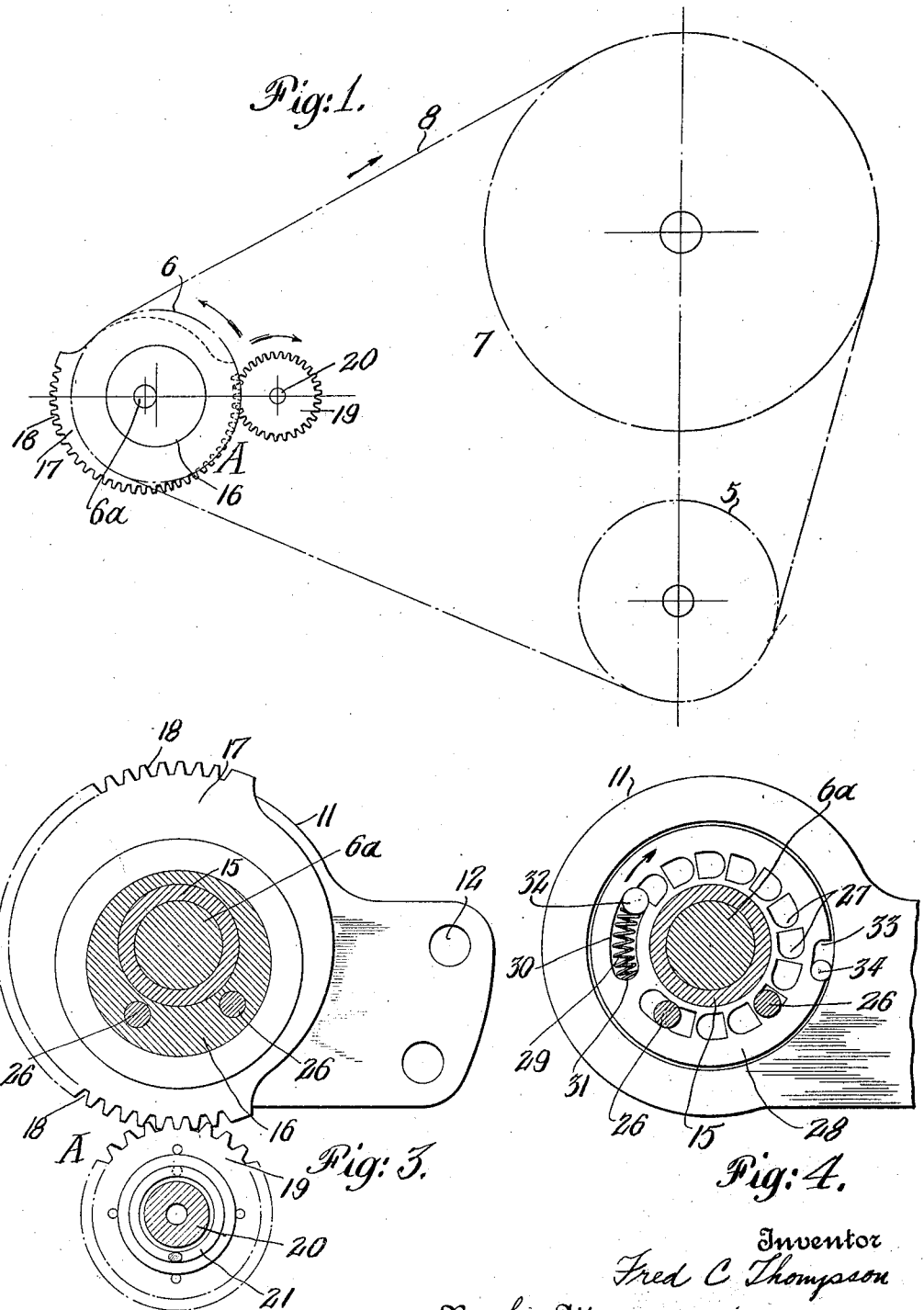

*Fig: 2.*

Patented Mar. 10, 1931

1,795,908

UNITED STATES PATENT OFFICE

FRED C. THOMPSON, OF DETROIT, MICHIGAN, ASSIGNOR TO MORSE CHAIN COMPANY, OF ITHACA, NEW YORK, A CORPORATION OF NEW YORK

CHAIN-ADJUSTING DEVICE

Application filed January 26, 1926. Serial No. 83,791.

This invention relates to adjusting devices and is particularly useful in connection with front end drives for automobiles.

One of the primary objects of this invention is the provision of a simple, compact and effective chain adjusting device which may be readily installed in existing apparatus.

Another object of this invention is the provision of a device of the character described in which the danger of overadjustment is eliminated.

How the foregoing, together with such other objects and advantages as may hereinafter appear, or are incident to my invention, are realized, is illustrated in preferred form in the accompanying drawings, wherein—

Fig. 1 is a diagrammatic front elevation of a typical front end layout of an automobile;

Fig. 2 is an enlarged sectional view of the preferred form of my device;

Fig. 3 is a section taken on the line 3—3 of Fig. 2, and

Fig. 4 is a face view showing a detail of my invention.

The front end layout shown in Fig. 1 is of the usual triangular arrangement and comprises a crank shaft sprocket 5, an accessory shaft sprocket 6 and a cam shaft sprocket 7 driven in clockwise direction by the chain 8.

The adjusting device indicated as a whole by the reference letter A is shown associated with the accessory shaft 6a and its sprocket 6 which is the preferred arrangement, although it is to be understood that the device may be associated with a stub shaft and idler sprocket.

Figure 2:
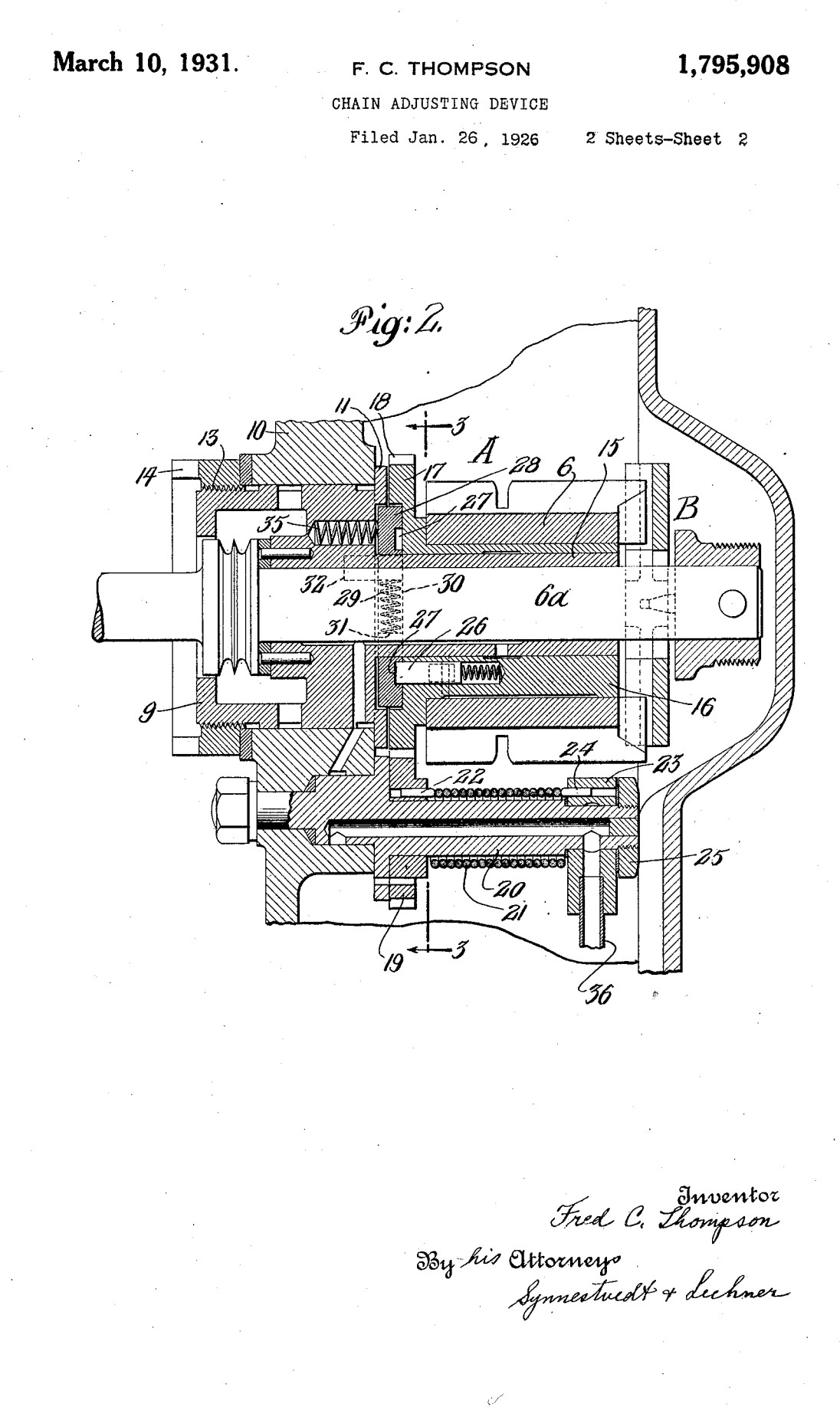

Referring now more particularly to Fig. 2, it will be seen that I have shown a bearing 9 detachably mounted in the frame 10, which in this instance is the gear housing of an automobile. The bearing 9 has a flanged portion 11 provided with holes 12 for securing it to the frame against rotation and a screw threaded portion 13 for the nut 14 by means of which it may be securely mounted to the frame. This bearing is also provided with a tubular extension 15 whereby an extended bearing is provided for the shaft 6a. On the extension 15 is rotatably mounted the eccentric 16 on which eccentric the sprocket wheel 6 over which the chain passes is rotatably mounted. The eccentric 16 is provided with a circular flanged portion 17 which is coaxial with the shaft 6a, and the periphery of which is provided with gear teeth 18. In this instance the teeth 18 are shown as extending somewhat over 180° around the periphery which is approximately the working range of the eccentric.

As a means for moving the eccentric in order to take up the slack in the chain, I have provided a spring actuated or rotated gear 19 mounted to mesh with the gear teeth 18 of the eccentric flange 17, said gear being mounted on the shaft 20 which is secured to the frame and being rotated by the torsion spring 21, one end of which engages the gear as at 22 and the other end of which engages the member 23 as at 24. The member 23 is rigidly secured to the shaft 20 by means of the nut 25. In this connection it is pointed out that the spring 21 is wound in a direction to cause the gear 19 to rotate in a clockwise direction.

As thus far described the device operates as follows:—

The gear 19 under the influence of the spring tends to rotate in a clockwise direction which tends to cause the eccentric 16 to rotate in a counterclockwise direction, by virtue of its geared association with the gear 19, so that the eccentric through the medium of the gear 6 operates on the chain to take out the slack.

When the chain is running there is a tendency for the pull of the chain on the sprocket to cause the eccentric to be moved back which, of course, would again develop slack unless provision is made to prevent this. In order to prevent such action I have provided a latch device for holding the eccentric in its positions of adjustment with which device I have associated means adapted to yield within certain limits to prevent the chain from being overadjusted as will now appear.

In this instance the latch device comprises two spring pressed latches or plungers 26 carried on the eccentric and adapted to snap into the notches 27 in the washer or plate 28 located between the eccentric 16 and the bearing 9, as adjustment takes place. By referring to Fig. 4 it will be seen that the plungers are so spaced with relation to the notches as to give a fine adjustment with relatively coarse notches. As the eccentric is moved the plungers snap into registering notches so that any backward thrusts on the eccentric, such as are caused by the running pull of the chain, are transmitted to the washer 28 moving it in the direction of the arrow shown in Fig. 4, such movement however being cushioned by the spring 29 located in the slot 30 in the washer 28, one end of said spring engaging the slot 30 at 31 and the other end engaging the pin 32 which is secured in the bearing 9. Thus it will be seen that the eccentric is yieldingly held in its positions of adjustment by means of this cushioned spring and slot connection and that danger of over adjustment is eliminated because the running pull of the chain is thus utilized to counteract a certain amount of the forces moving the eccentric. The amount of movement which may be given to the washer in this direction is determined by the slot or notch 33 in the washer and the pin 34 in the bearing 9.

Reverting now to Fig. 2 it will be seen that I have coupled the sprocket wheel 6 to the shaft 6a by means of a suitable coupling device, for example an Oldham coupling B, one portion of which is here shown as formed directly on the sprocket wheel. This wheel and the other parts of the coupling device are held in operative association by means of the springs 35 of which any suitable number may be employed. In installations in which the sprocket wheel 6 is merely an idler and the shaft 6a a stub shaft the coupling device may be dispensed with and a nut and washer may be substituted therefor to hold the sprocket wheel and eccentric against displacement.

Lubricant may be supplied to the various working parts of the device by means of a plurality of connected ports, annular passages and grooves, the lubricant being supplied thereto by means of the pipe 36 as will be clearly seen upon inspection of Fig. 2.

The arrangement is one by virtue of which it is possible to decrease the overall length of the device making it particularly useful where available space is restricted.

I claim:—

1. A tension adjuster for endless chains including means normally acting on the chain to take up slack therein and means supplementing the aforesaid means to yieldingly hold the eccentric in positions of adjustment, together with means limiting the amount of yield.

2. A tension adjuster for endless chains including an eccentrically mounted sprocket wheel over which the chain passes, means for moving said wheel and its mounting into various positions of eccentricity to take up slack in the chain including a spring rotated gear having geared connection with the eccentric mounting.

3. A tension adjuster for endless chains including an eccentrically mounted sprocket wheel over which the chain passes, means for moving said wheel and its mounting into various positions of eccentricity to take up slack in the chain including a spring rotated gear having geared connection with the eccentric mounting, together with means for yieldingly holding said wheel and its mounting in positions of adjustment.

4. A tension adjuster for endless chains including a frame, a shaft, a bearing for said shaft detachably secured to said frame, an eccentric mounted for rotation about the axis of said shaft and having a gear portion, a sprocket wheel rotatably mounted on said eccentric over which the chain passes, and means for moving the eccentric to take up slack in the chain including a spring rotated gear meshing with the gear portion of said eccentric.

5. A tension adjuster for endless chains including a frame, a shaft, a bearing for said shaft detachably secured to said frame, an eccentric mounted for rotation about the axis of said shaft and having a gear portion, a sprocket wheel rotatably mounted on said eccentric over which the chain passes, and means for moving the eccentric to take up slack in the chain including a spring rotated gear meshing with the gear portion of said eccentric.

6. A tension adjuster for endless chains including yieldable means normally operating on the chain in a direction to take up slack therein, and means preventing yield of the aforesaid means beyond a limited amount in a reverse direction including a stop member and a fixed support carrying said member.

7. A front end drive for automobiles comprising in combination two or more sprocket wheels, a chain passing over said wheels, a shaft for one of said wheels, a bearing for said shaft having an extension, an eccentric revoluble on said extension, means normally tending to rotate said eccentric in a direction to shift said wheel to take up slack in the chain, means supplementing the aforesaid means to yieldingly hold the eccentric in positions of adjustment, and means limiting the amount of yield.

In testimony whereof I have hereunto signed my name.

FRED C. THOMPSON.